United States Patent
Herges et al.

(10) Patent No.: US 8,925,698 B2
(45) Date of Patent: Jan. 6, 2015

(54) AUTOMOTIVE BRAKE CYLINDER COMPRISING A SEALING SYSTEM WHICH TOLERATES TILTS OF A RIGID BRAKE PISTON

(75) Inventors: Michael Herges, Munich (DE); Alain Fantazi, Dives sur mer (FR); Franck Hemery, Honfleur (FR); Zoltan Skriba, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 490 days.

(21) Appl. No.: 13/083,008

(22) Filed: Apr. 8, 2011

(65) Prior Publication Data

US 2011/0247907 A1    Oct. 13, 2011

Related U.S. Application Data

(63) Continuation of application No. PCT/EP2009/007183, filed on Oct. 7, 2009.

(30) Foreign Application Priority Data

Oct. 9, 2008   (DE) .......................... 10 2008 051 118

(51) Int. Cl.
*B60T 11/10*   (2006.01)
*F16J 15/32*   (2006.01)
(Continued)

(52) U.S. Cl.
CPC ............. *F16J 15/3236* (2013.01); *B60T 17/08* (2013.01); *F16D 65/28* (2013.01); *F16J 15/48* (2013.01); *F16D 2121/02* (2013.01); *F16D 2121/14* (2013.01)
USPC ............... 188/368; 188/170; 92/129; 92/193; 277/353; 277/461

(58) Field of Classification Search
USPC ...... 188/368, 153 A, 153 R, 53, 170; 92/193, 92/248–249, 261, 129; 277/584, 461, 589, 277/345, 438, 439, 353
See application file for complete search history.

(56) References Cited

U.S. PATENT DOCUMENTS

2,561,454 A * 7/1951 Willams .......................... 188/53
4,177,837 A * 12/1979 Frank et al. ..................... 138/31
(Continued)

FOREIGN PATENT DOCUMENTS

DE    22 63 323        6/1974
DE    36 24 475 A1    1/1988
(Continued)

OTHER PUBLICATIONS

International Search Report dated Feb. 25, 2010 with English translation (six (6) pages).

*Primary Examiner* — Anna Momper
*Assistant Examiner* — San Aung
(74) *Attorney, Agent, or Firm* — Crowell & Moring LLP

(57) ABSTRACT

A brake cylinder includes a pressure medium actuated brake piston delimiting a brake chamber and connected to a brake piston rod. The brake piston, together with the piston rod, swivels into positions tilted from a center axis of the brake cylinder during an actuation stroke. The brake piston is rigid and has a guide surface in the shape of a spherical surface of an imaginary sphere on its radially outer peripheral surface. The guide surface is guided along a radially inner cylinder wall of the brake cylinder with the center of the sphere lying on the center axis of the brake cylinder. The brake piston further has at least one elastic sealing element radially displaceable in a radially outer annular groove of the brake piston and delimiting an annular space together with a groove base of the annular groove on its side facing away from the radially inner cylinder wall. The annular space is fluidically coupled to the brake chamber such that contact pressure of the outer diameter of the sealing element against the radially inner cylinder wall of the brake cylinder depends on the pressure in the brake chamber.

9 Claims, 3 Drawing Sheets

(51) Int. Cl.
*B60T 17/08* (2006.01)
*F16D 65/28* (2006.01)
*F16J 15/48* (2006.01)
*F16D 121/02* (2012.01)
*F16D 121/14* (2012.01)

(56) References Cited

U.S. PATENT DOCUMENTS

| | | | | |
|---|---|---|---|---|
| 4,178,000 A | * | 12/1979 | Kuttner | 277/468 |
| 4,472,995 A | * | 9/1984 | Persson | 91/189 A |
| 4,541,640 A | | 9/1985 | Tregonning | |
| 4,944,215 A | * | 7/1990 | Nimmo et al. | 92/168 |
| 5,836,235 A | * | 11/1998 | Rudiger et al. | 92/178 |
| 6,234,587 B1 | | 5/2001 | Gerum et al. | |
| 2010/0075805 A1 | * | 3/2010 | Iraschko | 477/182 |

FOREIGN PATENT DOCUMENTS

| | | |
|---|---|---|
| DE | 37 31 814 A1 | 4/1988 |
| DE | 197 56 519 A1 | 10/1998 |
| DE | 103 27 777 A1 | 1/2005 |
| EP | 0 279 044 A2 | 8/1988 |
| FR | 2 318 369 A | 2/1977 |

\* cited by examiner

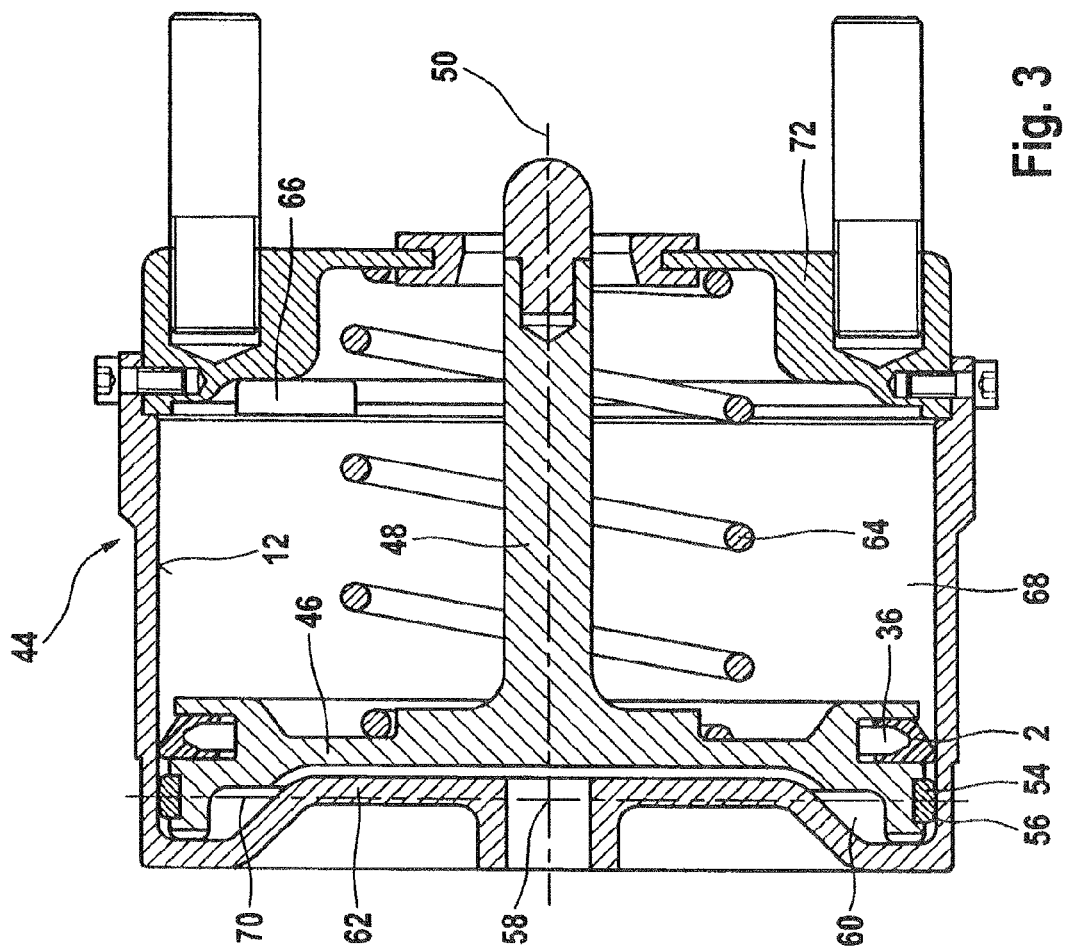
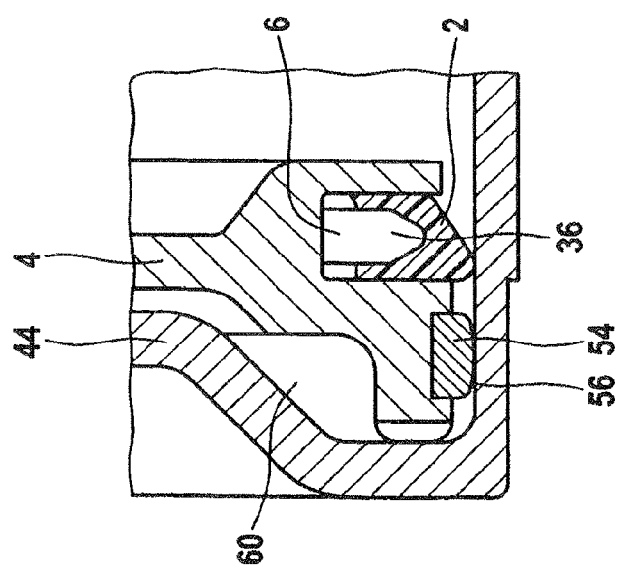

AUTOMOTIVE BRAKE CYLINDER COMPRISING A SEALING SYSTEM WHICH TOLERATES TILTS OF A RIGID BRAKE PISTON

CROSS-REFERENCE TO RELATED APPLICATIONS

This application is a continuation of PCT International Application No. PCT/EP2009/007183, filed Oct. 7, 2009, which claims priority under 35 U.S.C. §119 from German Patent Application No. DE 10 2008 051 118.8, filed Oct. 9, 2008, the entire disclosures of which are herein expressly incorporated by reference.

BACKGROUND AND SUMMARY OF THE INVENTION

The invention relates to an automotive brake cylinder in which a pressure medium actuated brake piston is guided. The brake piston delimits a brake chamber and is connected to a brake piston rod acting on brake actuating elements, wherein a pressure medium connection for supplying pressure medium to and/or removing pressure medium from the brake chamber is provided. The brake piston rod together with the brake piston pivots into positions tilted from a center axis of the brake cylinder during an actuation stroke.

A brake cylinder of the above-mentioned type is disclosed, for example, in DE 197 56 519 A1. In this case, the constructional unit consisting of a brake piston and brake piston rod is coupled via the piston rod to a rotary lever of a brake application device of a disc brake of a commercial vehicle. The rotary lever is mounted at the other end on a brake caliper of the disc brake via a brake application shaft. The brake application shaft has a cam contour which, upon rotation about the longitudinal axis thereof, results in a relative displacement of the brake caliper and of a brake pad in the direction of the brake disc. However, upon a piston stroke of the brake piston in the brake cylinder, the coupling point of the brake piston rod on the rotary lever rotates about the brake application shaft, resulting in tilting or pivoting of the constructional unit consisting of the brake piston and brake piston rod within the brake cylinder.

In order to permit pivoting movements of the brake piston in relation to the brake cylinder, the brake piston is in the form of a flexible piston diaphragm, which is fastened via the radially outer circumferential border thereof to the brake cylinder and is supported by a brake piston rod plate connected to the brake piston rod. Owing to the elasticity thereof, a piston diaphragm of this type is capable of compensating for pivoting movements of the brake piston rod occurring during a piston stroke.

However, as the stroke becomes larger, a piston diaphragm of this type is placed partially against the radially inner cylinder wall of the brake cylinder, as a result of which the piston diaphragm surface, which is effective with regard to the pressure of the pressure medium, changes in relation to the piston stroke. This necessitates a deviation in the desired linearity between the piston stroke and brake force generated. Furthermore, a piston diaphragm of this type requires a relatively large construction space in the radial direction because the border thereof has to be fastened or clamped to the radially inner cylinder wall of the brake cylinder.

It would therefore appear appropriate, by contrast, to seek a solution in which the brake piston is of rigid design, not deformed when pressurized and is guided with the radially outer circumferential border thereof directly on the radially inner cylinder wall of the brake cylinder. However, when a rigid brake piston is used instead of a flexible piston diaphragm, there is the problem that the small air gap present between the radially outer circumferential surface of the brake piston and the radially inner cylinder wall of the brake cylinder should be the same size in each pivoted position of the brake piston in order to ensure consistent guidance of the brake piston in the brake cylinder in each pivoted position of the brake piston.

The invention is therefore based on the object of developing a brake cylinder of the above-mentioned type such that the disadvantages described above are avoided.

This and other objects are achieved by an automotive brake cylinder in which a pressure medium actuated brake piston is guided. The brake piston delimits a brake chamber and is connected to a brake piston rod acting on brake actuating elements, wherein a pressure medium connection for supplying pressure medium to and/or removing pressure medium from the brake chamber is provided. The brake piston rod together with the brake piston pivots into positions tilted from a center axis of the brake cylinder during an actuation stroke. The brake piston is of rigid design and is provided on the radially outer circumferential surface thereof with a guide surface which is guided along a radial inner cylinder wall of the brake cylinder and is in the form of a spherical segment of an imaginary sphere. The center point of the imaginary sphere lies on the center axis of the brake cylinder. At least one elastic sealing element, which is movable radially in a radially outer annular groove of the brake piston on the side thereof which faces away from the radially inner cylinder wall of the brake cylinder, delimits, together with a groove base of the annular groove, an annular space which is fluidically connected to the brake chamber such that the contact pressure of the outer diameter of the sealing element against the radially inner cylinder wall of the brake cylinder depends on the pressure prevailing in the brake chamber.

According to a first aspect of the invention, the brake piston is of rigid design, i.e. it is only negligibly deformed, if at all, under the changes in pressure or pressurizations occurring during operation. Furthermore, in contrast to a piston diaphragm, the brake piston together with seals and guide elements is guided and displaced uniformly within the radially inner cylinder wall of the brake cylinder, i.e. all of the components of the brake piston execute the same piston stroke at the same time.

As a result, the brake cylinder can be constructed to be smaller in diameter because, in contrast to a piston diaphragm, no border fastening is necessary, and the brake piston is guided coaxially within the radially inner cylinder wall of the brake cylinder. Therefore, with the same diameter, a cylinder-piston drive having a rigid brake piston can produce a greater force than one with a flexible piston diaphragm. Therefore, "rigid" is intended to be understood as meaning any material behavior making it possible to act upon the brake piston with operating pressure without the brake piston losing its function or leakages occurring by, for example, the radially outer piston border slipping out of contact with the radially inner cylinder wall of the brake cylinder. Furthermore, the desired linear characteristic of the piston stroke/brake force can be implemented because a rigid brake piston surface, which is effective in relation to the pressure medium, is always the same size irrespective of the piston stroke.

According to a further aspect, the brake piston is provided on the radially outer circumferential surface thereof with a guide surface which is guided along a radial inner cylinder wall of the brake cylinder and is in the form of a spherical segment of an imaginary sphere, the center point of which lies on the center axis of the brake cylinder. The plane of this guide surface, which is in the form of a spherical segment, is therefore arranged perpendicularly to the brake piston rod. The brake piston can therefore pivot out in relation to the center position thereof without the size of the air gap between the guide surface thereof and the radial inner cylinder wall of the brake cylinder changing. The guidance of the brake piston in the brake cylinder is therefore independent of the particular piston stroke and in particular independent of the pivoted positions of the brake piston.

According to a further aspect, the invention proposes at least one elastic sealing element which is movable freely radially in a radially outer annular groove of the brake piston and, on the side thereof which faces away from the radially inner cylinder wall of the brake cylinder, delimits, together with a groove base of the annular groove, an annular space which is fluidically connected to the brake chamber in such a manner that the contact pressure of the outer diameter of the sealing element against the radially inner cylinder wall of the brake cylinder depends on the pressure prevailing in the annular space. A substantial advantage of a sealing element of this type is that it has a self-reinforcing sealing effect.

Without the application of a pressure generated by pressure means, the sealing element bears under a slight internal stress and with correspondingly little friction against the radial inner cylinder wall of the brake cylinder. Therefore, the sealing action which is then not necessary is low, and the brake piston can be displaced under a slight friction in relation to the radially inner cylinder wall of the brake piston.

Upon application of a brake pressure in the brake chamber, the brake pressure passes into the annular space between the groove base and sealing element, as a result of which the latter is pushed with greater strength in the radial direction against the radially inner cylinder wall of the brake cylinder, thus increasing the sealing action. When the brake chamber is acted upon with pressure medium, the contact pressure of the sealing element in relation to the radially inner cylinder wall of the brake cylinder is consequently increased, this bringing about the then necessary greater sealing action in a self-reinforcing manner.

The combination of the features of the rigid brake piston with the tiltable mounting of the brake cylinder via a guide surface in the shape of a spherical segment and with a self-reinforcing elastic seal therefore affords the abovementioned advantages.

In a further development, the guide surface is particularly preferably formed on a guide ring held on the radially outer circumferential surface of the brake piston. A guide ring of this type can easily be exchanged, for example due to wear.

At least one sealing element of this type is preferably arranged offset axially with respect to a plane containing the center point of the imaginary sphere perpendicular to the center axis of the brake cylinder. There is then a lever arm between the sealing element and the center point of the imaginary sphere, about which the brake piston pivots together with the brake piston rod such that the eccentric arrangement of the sealing element with respect to the center point of the imaginary sphere has the effect that, upon pivoting of the brake piston about the center point, the contact pressure of the sealing element against the radially inner cylinder wall of the brake piston is higher in one circumferential region and lower in another circumferential region. This would result in a smaller sealing action in the circumferential region of the sealing element having the lower contact pressure per se. However, the lower contact pressure of the sealing element in the one circumferential region is compensated for by the annular space of the sealing element being acted upon with pressure medium from the brake chamber and therefore with rising contact pressure such that there is a favorable sealing action even in this circumferential region of the sealing element.

The smaller the axial offset is between the center point of the imaginary sphere, which forms the spherical segment as a guide surface, and the sealing element, the more uniformly the contact pressure between the sealing element and the radially inner cylinder wall of the brake cylinder is distributed with respect to the circumferential direction and the better is the sealing action. In order to obtain as small as possible an axial offset or lever arm between the center point of the imaginary sphere as the pivot point of the brake piston and the sealing element, the guide ring is therefore preferably arranged in the immediate vicinity of the sealing element.

Since the sealing element is designed as a sealing ring which has a fluidic connection between the annular space and a surface section of the head surface, which surface section lies with respect to a first sealing edge on the side which is pressurized to a greater extent, the pressure medium located under the foot part of the sealing ring can pass via the fluidic connection to the low pressure side, this causing a pressure loss on the high pressure side, which can be unambiguously detected by the tightness test which is to be carried out before the sealing arrangement is put into operation. This measure, consequently reliably prevents the sealing arrangement from being put into operation with the sealing ring fitted wrongly.

According to a particularly preferred embodiment, the fluidic connection is formed by at least one radially extending groove in that side wall of the sealing ring which is pressurized to a greater extent, i.e. in the side wall facing the brake chamber. A groove of this type can be produced by an only slight change in the injection mold for the sealing ring by means of the additional provision of a radially encircling projection, and therefore the measure can be implemented relatively cost-effectively.

According to a development of this embodiment, one end of the radial groove opens close to the first sealing edge and the other end opens at the end of that ring part of the sealing ring which faces the side which is pressurized to a greater extent. This produces a flow path which, with regard to the flow resistance, is advantageously short, this favoring the dissipation of pressure on the high pressure side in the event of wrong fitting.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a cross-sectional illustration of the brake cylinder with a brake piston guide surface designed as a spherical segment;

FIG. 4 is an enlarged detail from FIG. 3; and

DETAILED DESCRIPTION OF THE DRAWINGS

Figure 1:
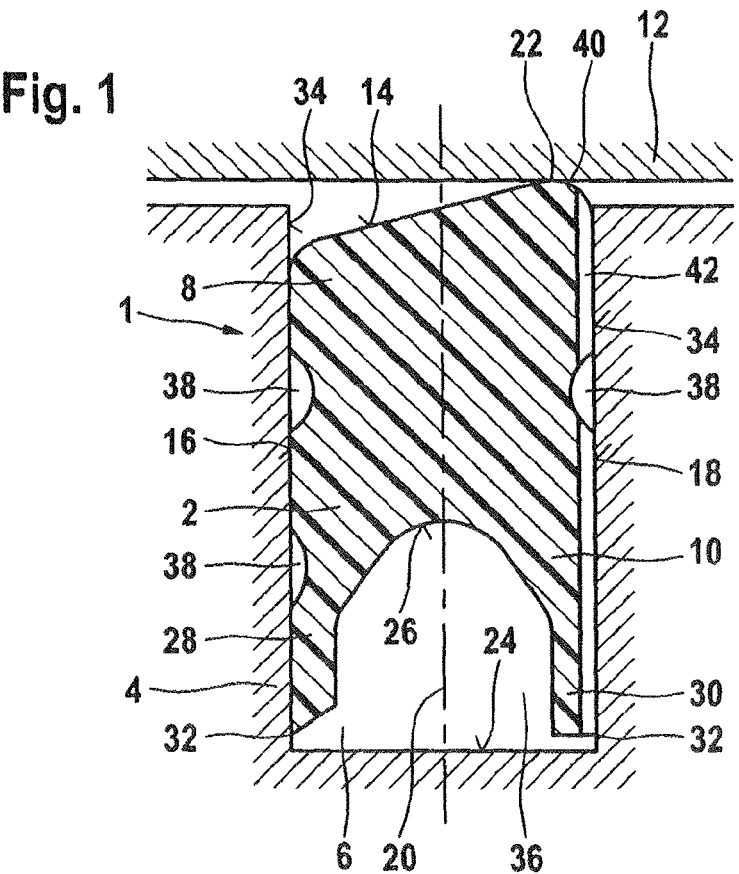
FIG. 1 is a cross-sectional illustration of a sealing ring of a brake piston guided in a brake cylinder according to a preferred embodiment of the invention in the fitted position.

The sealing arrangement 1, which is shown in FIG. 1, with the sealing ring 2 serves to seal off a brake chamber 60 of a brake cylinder 44, which is shown in FIG. 3, from a spring chamber 68 of the brake cylinder 44. The brake cylinder 44 is a pressure medium actuated, in particular a pneumatically actuated service brake cylinder for actuating a disc brake of a commercial vehicle. The brake cylinder 44 forms, for example, the service brake part of a combination cylinder formed from a service brake cylinder and spring accumulator brake cylinder, as disclosed in particular in DE 198 301 54 A1.

For this purpose, the sealing ring 2 is inserted into a radially outwardly open annular groove 6 which is formed in a brake piston 4 of the brake cylinder 44 and has a substantially rectangular cross section. The sealing ring 2 has a head part 8 and a foot part 10. In the radial direction facing the cylinder wall 12 of the brake cylinder 44, the head part 8 ends with a head surface 14 which is in the manner of an envelope of a cone and extends virtually over the entire width of the sealing ring 2 from one side wall 16 of the sealing ring 2 over a radial center plane 20 as far as the other side wall 18. The one side wall 16 is that side of the sealing ring 2 to be acted upon with the lower pressure (spring chamber 68 in FIG. 3) and the other side wall 18 is that side of the sealing ring 2 which is to be acted upon with the higher pressure (brake chamber 60 in FIG. 3).

In the region of the transition of the other side wall 18 to the head surface 14 there is a rounded first sealing edge 22, and the transition on the other side from the head surface 14 to the one side wall 16 can likewise be of rounded design. More precisely, the first sealing edge 22 is located outside the radial center plane 20, preferably at least close to the other side wall 18 of the sealing ring 2 on the side pressurized to a greater extent (brake chamber 60 in FIG. 3). In this case, the head surface 14 is inclined in such a manner that it is closer at the one side wall 16 to the foot part 10 than at the other side wall 18. As a modification, it is possible to displace the first sealing edge 22 slightly away from the other side wall 18 in the direction of the radial center plane 20. The first sealing edge 22 is then adjoined on the right-hand side as far as the other side wall 18 by a head surface section 40 which is inclined in the opposite direction to the head surface 14.

Figure 2:
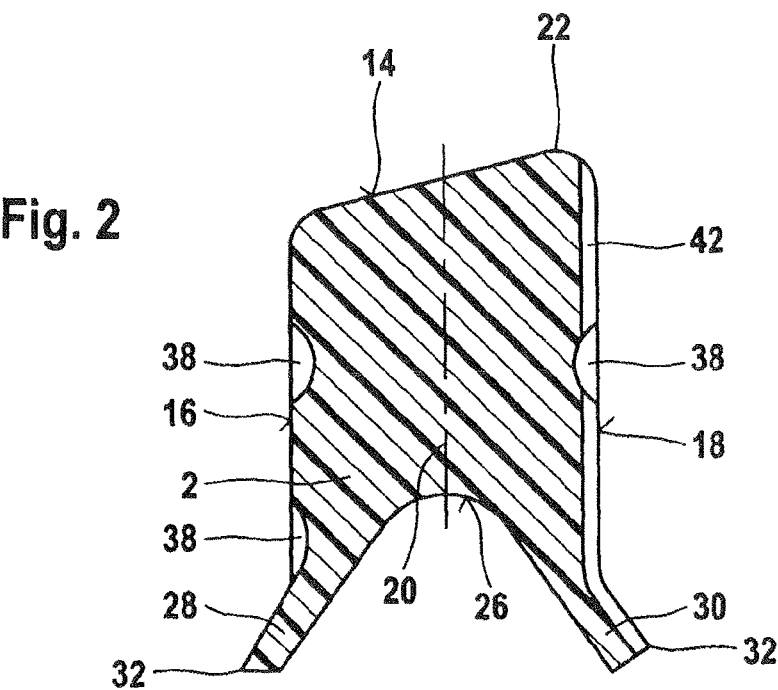
FIG. 2 is a cross-sectional illustration of the sealing ring from FIG. 1 in the removed state.

The foot part 10 of the sealing ring 2, which foot part faces the groove base 24 of the annular groove 6, is divided radially, with the dividing base 26 being well rounded. As an extension of the side walls 16, 18, the sealing ring 2 therefore has narrow ring parts 28, 30 which spread apart somewhat from each other to the same extent under a resilient internal stress and end at two sealing edges 32. The spreading apart of the two ring parts 28, 30 can best be seen with reference to FIG. 2, in which the sealing ring 2 is illustrated in its removed state.

In the fitted state according to FIG. 1, the two ring parts 28, 30 are curved with respect to each other, wherein the second sealing edges 32 bear under prestress against the side walls 34 of the ring groove 6 close to the groove base 24. In this case, the ring parts 28, 30 bound an annular space 36 therebetween and the groove base 24 of the annular groove 6. In the extension region of the ring parts 28, 30 and in the region of the head part 8, the sealing ring 2 is provided on both sides with a respective rounded recess 38 formed in the manner of an annular groove. On the pressurization side, the recesses 38 may also be omitted. The recesses 38 can be filled with lubricant upon installation.

The sealing ring 2 can be formed in a manner providing a seal radially on the outside or radially on the inside, i.e. the first sealing edge 22 thereof is located at the point of the greatest or smallest diameter of the sealing ring 2. In the case of FIG. 1, it is arranged providing a seal on the outside. After insertion, the ring parts 28, 30 bear with the second sealing edges 32 thereof under elastic prestress against the side walls 34 of the annular groove 6, with at least the second sealing edge 32 which is on the left-hand side according to FIG. 1 and faces the low pressure side providing a seal. The second sealing edge 32 which faces that side wall 18 of the sealing ring 2 which can be pressurized to a greater extent and is on the right-hand side according to FIG. 1 can be omitted or designed to be untight. The cylinder wall 12 surrounds the sealing ring 2, with the first sealing edge 22 also bearing there in a sealing manner under elastic material prestress.

A fluidic connection is formed between the annular space 36 and a surface section 40 of the head surface 14 of the sealing ring 2, which surface section lies on the side pressurized to a greater extent (brake chamber 60 in FIG. 3) with respect to the first sealing edge 22. The fluidic connection is preferably formed by at least one radially extending groove 42 in the other side wall 18, which is pressurized to a greater extent, of the sealing ring 2, i.e. the side toward the brake chamber 60. Six grooves 42 arranged at a circumferential distance from one another are preferably provided on the sealing ring 2. In this case, for example, one end of a radial groove 42 of this type opens close to the first sealing edge 22 and the other end opens at the end of that ring part 30 of the sealing ring 2 which faces the side which is pressurized to a greater extent. Instead of the radial groove 42, as an alternative a spiral groove or knobs are also possible as the shortest connection between that surface section 40 of the head surface 14 which is mounted upstream of the first sealing edge 22 and the annular space 36.

If the sealing ring 2 is now acted upon from the right with pressure medium from the brake chamber 60, the pressure medium passes in the annular groove 6 past the right-hand-side second sealing edge 32 between the groove base 24 and the two ring parts 28, 30 and expands the sealing ring 2 radially outward. In the process, the first sealing edge 22 is pressed to a greater extent against the cylinder wall 12 of the brake cylinder 44, thus reinforcing the sealing action. It is essential here for the action of the pressure medium to load the sealing ring 2, for example over the entire axial width thereof, radially outward, but radially inward on a surface section 40, which is imperceptibly small by contrast, at the transition of the first sealing edge 22 to the other side wall 18. At the same time, the pressurization presses the sealing ring 2 by one side wall 16 thereof against the side wall 34 of the annular groove 6.

If the brake piston 4 experiences local displacement within the context of the small amount of play therebetween and the cylinder wall 12, then the sealing ring 2 is capable of following said displacement with the radial pressurization thereof acting on the foot part 10. The friction of the sealing ring 2 against the left side wall 34 of the annular groove 6, which friction is reduced by filling the recesses 38 with grease, is not capable of preventing the following movement of the sealing ring 2. The first sealing edge 22 therefore remains like the second sealing edge 32 of the left ring part 28, which faces the side pressurized to a lower extent, in sealing contact with the cylinder wall 12 or the side wall 34 of the annular groove 6 of the piston 4.

As described at the beginning, the cylinder-piston drive in which the sealing arrangement 1 from FIG. 1 is used involves a pressure medium actuated brake cylinder 44, in particular a pneumatically actuated service brake cylinder, in which the pneumatically chargeable service brake piston 4 is guided. The brake piston rod 48 is fastened nonrotatably and fixed axially to the brake piston 4 and is coupled to a rotary lever of a brake application device (not shown for reasons of scale in FIG. 3) of the commercial vehicle disc brake. The rotary lever is mounted on the other side on a brake caliper of the disc brake via a brake application shaft. The rotary lever is connected to a brake application shaft for rotation therewith, the brake application shaft having a cam contour which, upon rotation about the longitudinal axis thereof, leads to a relative displacement of the brake caliper and of a brake pad in the direction of the brake disc, in the manner as described in DE 197 56 519 A1. Then, upon displacement of the brake piston 4, the coupling point of the brake piston rod 48 to the rotary lever rotates about the brake application shaft, this resulting in the constructional unit consisting of the brake piston 4 and brake piston rod 48 tilting within the brake cylinder 44. In other words, the brake piston rod 48 pivots together with the brake piston 4 during an actuating stroke in a position tilted from a center axis 50 of the brake cylinder 44.

However, by contrast to DE 197 56 519 A1, the brake piston 4 is of rigid design rather than being designed as a piston diaphragm, i.e. it is deformed only unsubstantially, if at all, under the forces occurring during operation. Furthermore, in contrast to a piston diaphragm, the brake piston 4 together with the sealing ring 2 and a guide ring 54 is guided or displaced under pressure medium actuation uniformly within the cylinder wall 12 or within the radially inner cylinder wall of the brake cylinder 44, i.e. the brake piston 4 and all of the components thereof are displaced at the same time and by the same amount.

The brake piston 4 is provided on the radially outer circumferential surface thereof with a guide surface 56, which is guided along the radial inner cylinder wall 12 of the brake cylinder 44 and is in the form of a spherical segment of an imaginary sphere, the center point 58 of which lies on the center axis 50 of the brake cylinder 44. The guide surface 56, which is in the form of a spherical segment, is symmetrical with respect to the center plane 70 thereof, in which the center point 58 of the imaginary sphere lies, wherein the center plane 70 is arranged perpendicularly to the brake piston rod 48 and to the center axis 50.

Figure 5:
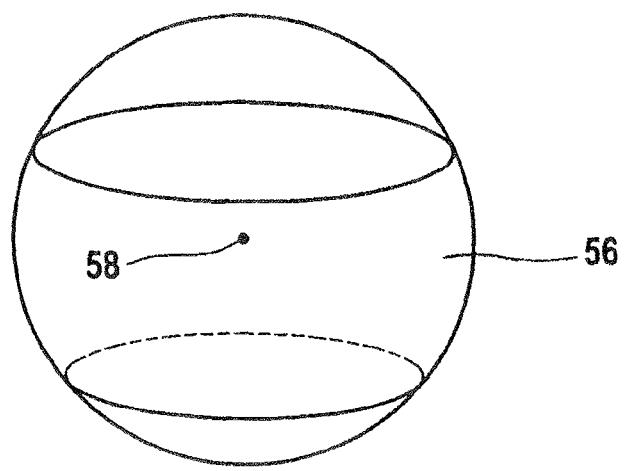
FIG. 5 is a perspective view of a spherical segment.

A spherical segment 56 of this type is explained by way of example in FIG. 5, in which the radially inner cylinder wall 12 of the brake cylinder 44 and the guide surface 56 in the form of a spherical segment are in linear touching contact. Therefore, the brake piston 4 and the brake piston rod 48 can pivot as a unit during operation from the center position shown in FIG. 3 about the center point 58 without the size of the small air gap along the line of contact between the guide surface 56 and the radial inner cylinder wall 12 of the brake cylinder 44 changing.

The guide surface 56 is formed on a guide ring 54, which is held on the radially outer circumferential surface of the brake piston 4, wherein the guide ring 54 is arranged in the immediate vicinity of the sealing ring 2, as shown in particular in FIG. 4.

By pressurizing the brake chamber 60 which extends between a base wall 62 of the brake cylinder 44 and the brake piston 4, the latter can be brought into the brake application position counter to the action of a restoring spring 64 which is supported at one end on the brake piston 4 and at the other end on an end wall 72 of the brake cylinder 44. A pressure medium connection which is not visible in the view of FIG. 3 serves to supply pressure medium to and/or remove pressure medium from the brake chamber 60. A valve 66 ensures venting of a spring chamber 66, which contains the restoring spring 64, if the brake piston 4 which is charged with pressure medium reduces the size of the spring chamber 66. The spring chamber 66 forms that side of the sealing ring 2 which is acted upon with the lower pressure while the brake chamber 60 constitutes that side of the sealing ring which is acted upon with the higher pressure, wherein the sealing ring 2 seals off both chambers 60 and 66 from each other.

Against this background, the functioning of the brake cylinder 44 is as follows:

Starting from the situation shown in FIG. 3, in which the service brake is released, for the application of the service brake the brake chamber 60 is pressurized via the pressure medium connection, whereupon, firstly, the brake piston 4 is displaced away from the base wall 62 to the right. Transferred to the situation of FIG. 1, this means that the sealing ring 2 is acted upon from the right with pressure medium from the brake chamber 60. The pressure medium passes via the surface section 40 of the sealing ring 2 past the second sealing edge 32 on the right-hand side between the groove base 24 and the two ring parts 28, 30 and expands the sealing ring 2 radially outward. In the process, the first sealing edge 22 is pressed to a greater extent against the cylinder wall 12, thus reinforcing the sealing action. At the same time, the pressurization presses the sealing ring 2 by the one side wall 16 thereof against the side wall 34 of the annular groove 6. The simultaneous displacement of the brake piston 4 causes, firstly, the disc brake to be applied. Secondly, as already described at the beginning, the brake piston 4 together with the brake piston rod 48 tilts out of the center position 50, with the brake piston 4 being guided via the guide surface 56 in the form of a spherical segment on the radially inner cylinder wall 12, thus forming a type of joint. At the same time, pressure medium flows through the narrow air gap between the guide surface 56 and the radially inner cylinder wall 12 as far as the sealing ring 2 which then, as a consequence of the rise in pressure in the annular space 36 (see FIG. 1), exerts a greater contact pressure on the radially inner cylinder wall 12 and therefore brings about reliable sealing between the brake chamber 60 and the spring chamber 68.

By contrast, venting of the brake chamber 60 ensures that the brake piston 4 is displaced by the restoring spring 60 into its release position, i.e. to the left in FIG. 3, and strikes against the base wall 62. By means of the pressure which is then lower in the annular space 36, the release of the brake is made easier as a consequence of the lower friction between the sealing ring 2 and radially inner cylinder wall 12.

TABLE OF REFERENCE NUMBERS

1 Sealing arrangement
2 Sealing ring
4 Brake piston
6 Annular groove
8 Head part
10 Foot part
12 Cylinder wall
14 Head surface
16 Side wall
18 Side wall
20 Radial center plane
22 First sealing edge
24 Groove base
26 Gap base
28 Ring part
30 Ring part
32 Second sealing edge
34 Side wall
36 Annular space
38 Recess
40 Surface section
42 Radial groove
44 Brake cylinder 48 Brake piston rod
50 Center axis
54 Guide ring
56 Guide surface
58 Center point
60 Brake chamber
62 Base wall
64 Restoring spring
66 Valve
68 Spring chamber
70 Center plane
72 End wall The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An automotive brake cylinder, comprising:
   a pressure medium actuated brake piston guided in the brake cylinder, the brake piston delimiting a brake chamber and being connected to a brake piston rod which, in use, acts on a brake application device;
   a pressure medium connection for supplying pressure medium to and/or removing pressure medium from the brake chamber;
   wherein the brake piston has a rigid design and comprises a rigid guide surface on a radially outer circumferential surface of the brake piston, the guide surface being guided along a radial inner cylinder wall of the brake cylinder;
   wherein the guide surface is in a form of a spherical segment of an imaginary sphere, a center point of the imaginary sphere lying on a center axis of the brake cylinder, wherein the brake piston rod together with the brake piston is pivotable into positions tilted from the center axis of the brake cylinder during an actuation stroke;
   wherein the brake piston further comprises at least one elastic sealing element movable radially in a radially outer annular groove of the brake piston on a side thereof facing away from the radially inner cylinder wall of the brake cylinder;
   wherein the elastic sealing element delimits, together with a groove base of the annular groove, an annular space fluidically coupled to the brake chamber such that contact pressure of an outer diameter of the elastic sealing element against the radially inner cylinder wall of the brake cylinder depends on a pressure prevailing in the brake chamber; and
   wherein the guide surface in the form of the spherical segment is symmetrical with respect to a center plane thereof, the center plane being arranged perpendicular to the center axis and having the center point of the imaginary sphere lying in the center plane.

2. The brake cylinder according to claim 1, wherein the elastic sealing element is arranged offset axially with respect to the center point of the imaginary sphere.

3. The brake cylinder according to claim 2, wherein the guide surface is formed on a guide ring, the guide ring being held on the radially outer circumferential surface of the brake piston.

4. The brake cylinder according to claim 3, wherein the guide ring is arranged on the radially outer circumferential surface of the brake piston in an immediate vicinity of the elastic sealing element.

5. The brake cylinder according to claim 1, wherein the elastic sealing element is a sealing ring.

6. The brake cylinder according to claim 5, wherein the sealing ring includes a head part facing the radially inner cylinder wall of the brake cylinder, the head part having at least one head surface with a first sealing edge bearing against the radially inner cylinder wall of the brake cylinder;
   wherein the sealing ring has a foot part divided into two annular parts spread apart elastically from one another, the two annular parts in a fitted state of the sealing ring delimiting the annular space between the two annular parts and a groove base of the annular groove; and
   wherein the two annular parts end on sides facing away from each other with a respective second sealing edge interacting with a side wall of the annular groove.

7. The brake cylinder according to claim 6, wherein the head surface of the sealing ring extends from one side wall of the sealing ring on a side of a spring chamber of the brake cylinder over a radial center plane of the sealing ring to a side wall of the sealing ring on a side of the brake chamber;
   wherein the first sealing edge is located offset from the radial center plane closer to the side wall of the sealing ring on the side of the brake chamber; and
   wherein the elastic sealing ring has a fluidic coupling between the annular space and a surface section of the head surface, which surface section lies on the side of the brake chamber with respect to the first sealing edge.

8. The brake cylinder according to claim 7, wherein the fluidic connection comprises at least one radially extending groove in the side wall of the sealing ring on the side of the brake chamber.

9. The brake cylinder according to claim 8, wherein one end of the at least one radially extending groove opens close to the first sealing edge and the other end opens at an end of the annular part of the sealing ring facing the brake chamber.

* * * * *